United States Patent
Hoogzaad

(10) Patent No.: US 8,030,994 B2
(45) Date of Patent: Oct. 4, 2011

(54) DRIVER FOR AN INDUCTIVE LOAD

(75) Inventor: Gian Hoogzaad, Mook (NL)

(73) Assignee: NXP B.V., Eindhoven (NL)

( * ) Notice: Subject to any disclaimer, the term of this patent is extended or adjusted under 35 U.S.C. 154(b) by 580 days.

(21) Appl. No.: 12/093,793

(22) PCT Filed: Nov. 8, 2006

(86) PCT No.: PCT/IB2006/054166
§ 371 (c)(1),
(2), (4) Date: May 19, 2008

(87) PCT Pub. No.: WO2007/057817
PCT Pub. Date: May 24, 2007

(65) Prior Publication Data
US 2009/0045764 A1  Feb. 19, 2009

(30) Foreign Application Priority Data
Nov. 18, 2005  (EP) .................................... 05110979

(51) Int. Cl.
*H03F 3/38* (2006.01)
*H03K 3/00* (2006.01)

(52) U.S. Cl. .......... 330/10; 330/251; 318/671; 318/677; 332/107

(58) Field of Classification Search ................... 318/637, 318/638, 671, 677–682; 330/10, 251, 207 A, 330/291; 700/94; 332/106, 107, 109; 375/238, 375/346; 388/822, 910
See application file for complete search history.

(56) References Cited

U.S. PATENT DOCUMENTS

| | | | |
|---|---|---|---|
| 4,710,686 A | 12/1987 | Guzik | |
| 5,014,016 A | 5/1991 | Anderson | |
| 5,086,492 A | 2/1992 | Kent | |
| 6,011,902 A * | 1/2000 | Yamamoto | 388/815 |
| 6,373,336 B1 * | 4/2002 | Anderskouv et al. | 330/10 |
| 6,734,725 B2 * | 5/2004 | Masuda et al. | 330/10 |
| 6,940,343 B2 * | 9/2005 | Heubi et al. | 330/10 |
| 7,058,464 B2 * | 6/2006 | Mallinson | 700/94 |
| 7,417,497 B2 * | 8/2008 | Lee | 330/10 |
| 2004/0124915 A1 * | 7/2004 | Heubi et al. | 330/10 |
| 2005/0162222 A1 | 7/2005 | Hezar et al. | |
| 2006/0282185 A1 * | 12/2006 | Mallinson | 700/94 |
| 2007/0132509 A1 * | 6/2007 | Mochizuki | 330/10 |
| 2007/0273436 A1 * | 11/2007 | Lee | 330/10 |
| 2010/0201445 A1 * | 8/2010 | Guilherme et al. | 330/251 |

* cited by examiner

*Primary Examiner* — Eduardo Colon Santana

(57) ABSTRACT

A driver supplies an output voltage to an inductive load. The driver includes an input to receive a pulse width modulated control signal having a controllable duty cycle within a predetermined range. A first switch circuit receives a first switch signal to supply a first voltage, a second switch circuit receives a second switch signal to supply a second voltage, and the output voltage is the difference between the first voltage and the second voltage. An inverter and delay circuit receives the control signal to supply the first switch signal and the second switch signal being inverted and delayed with respect to each other. The delay of the delay circuit is selected to obtain an output voltage having a single polarity for each one of the controllable duty cycles within the predetermined range.

10 Claims, 5 Drawing Sheets

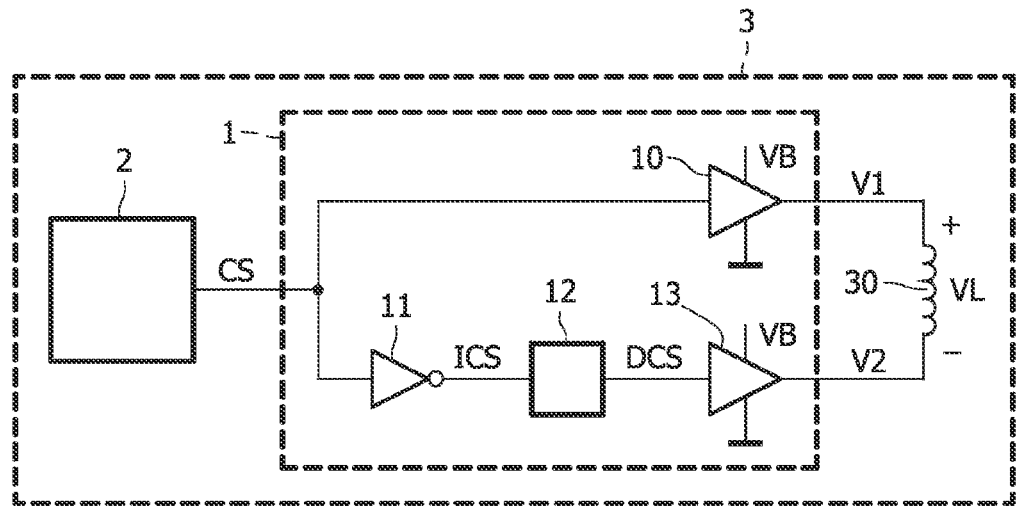
FIG. 3
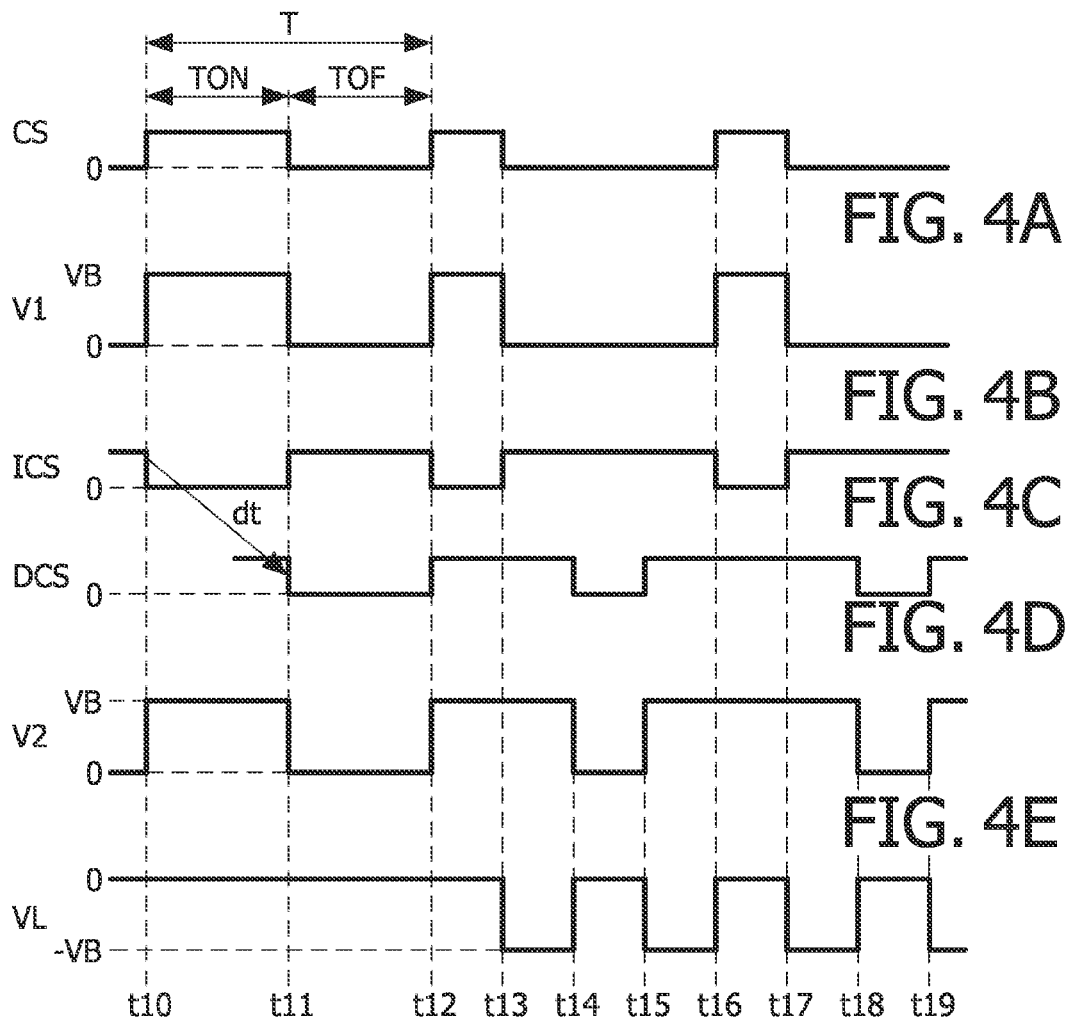
FIG. 4A
FIG. 4B
FIG. 4C
FIG. 4D
FIG. 4E
FIG. 4F

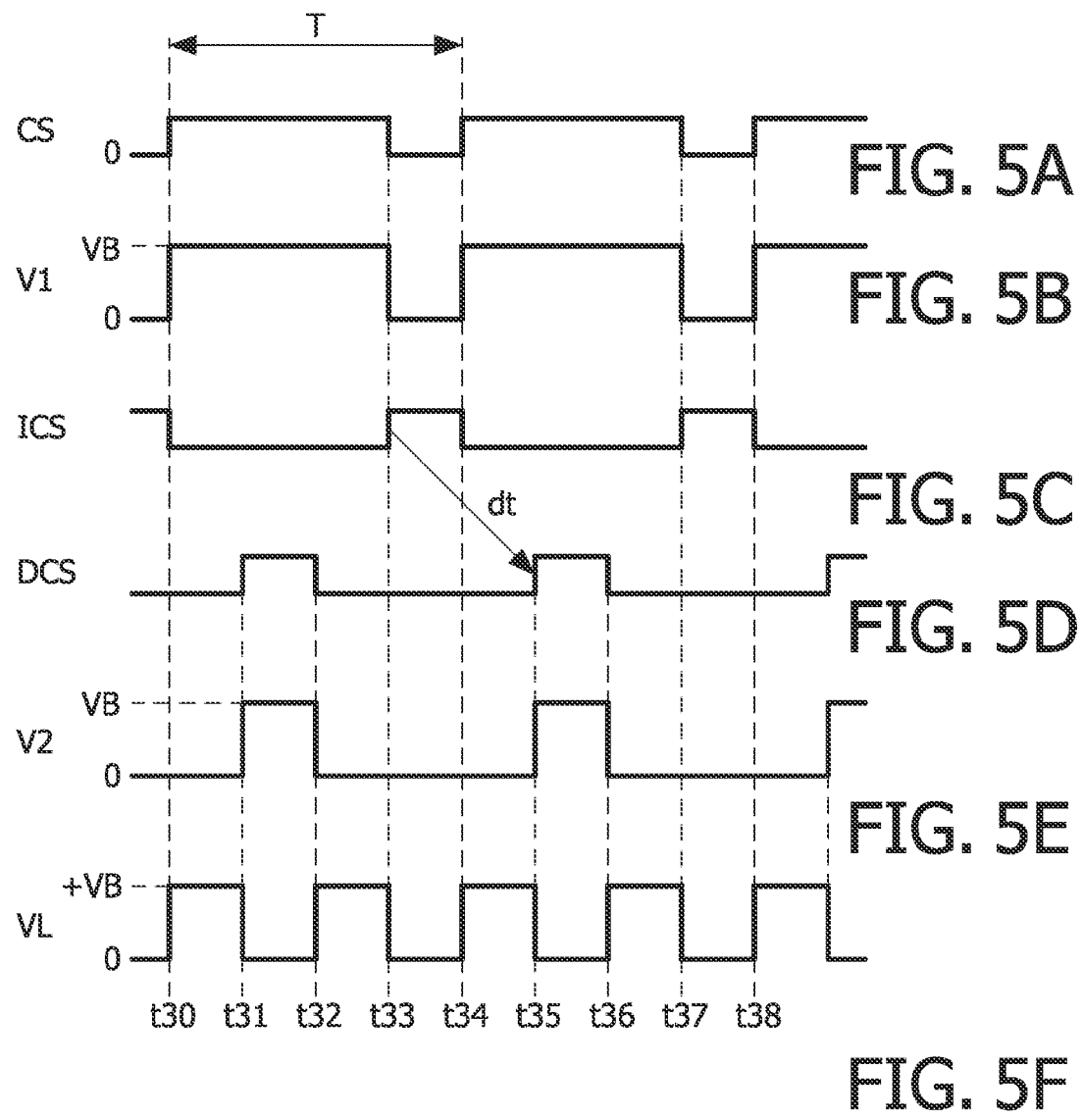

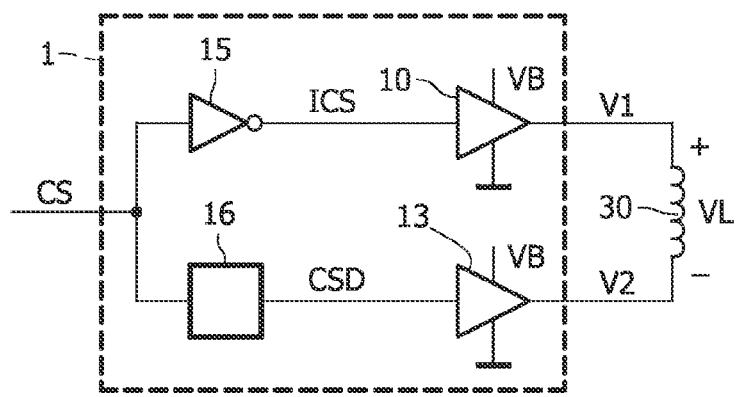
FIG. 6
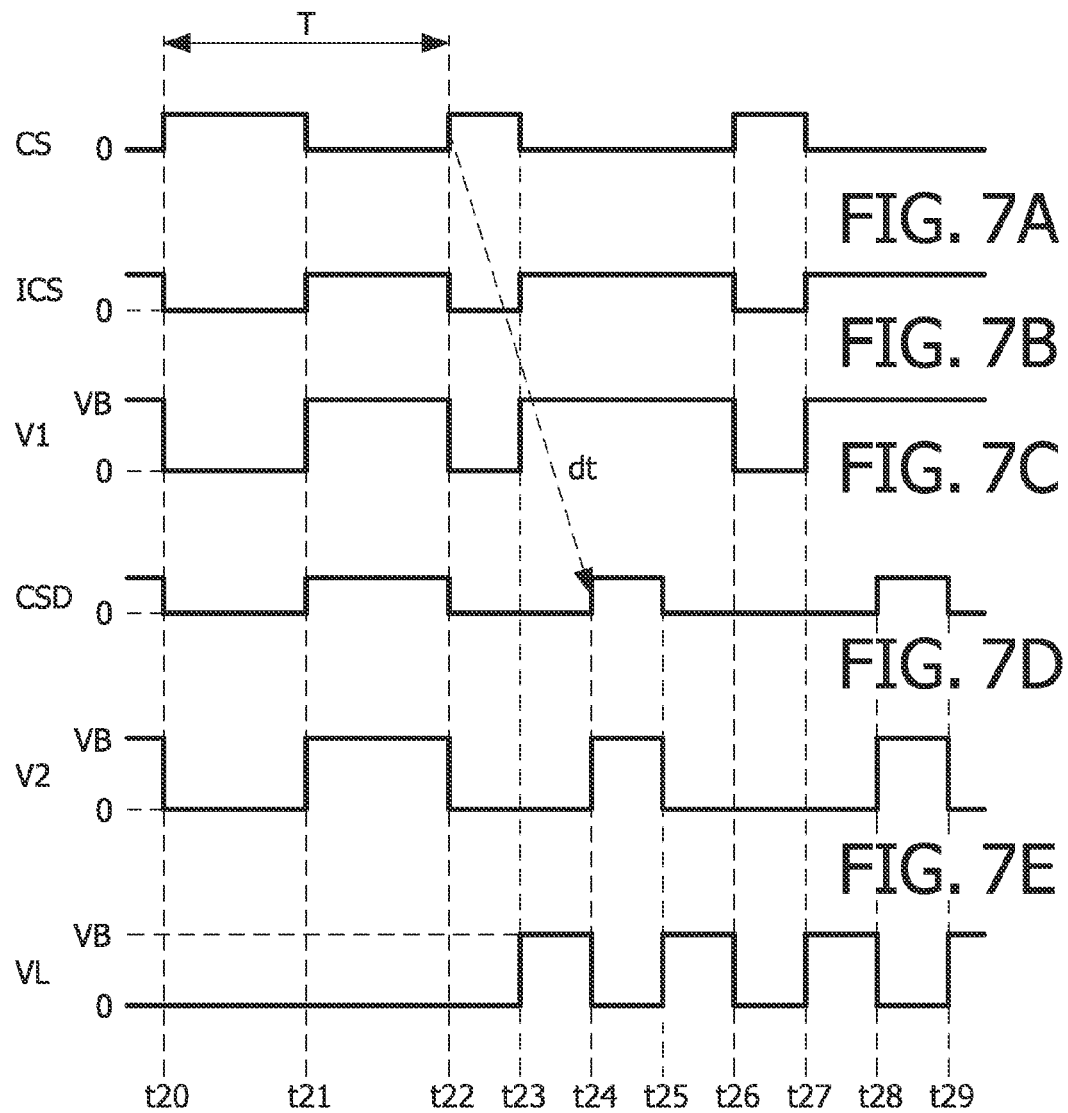
FIG. 7A
FIG. 7B
FIG. 7C
FIG. 7D
FIG. 7E
FIG. 7F

DRIVER FOR AN INDUCTIVE LOAD

FIELD OF THE INVENTION

The invention relates to a driver for driving an inductive load, a system comprising the driver, an optical disc drive comprising the system, and a method of driving an inductive load.

BACKGROUND OF THE INVENTION

U.S. Pat. No. 5,086,492 discloses a motor control circuit for a DC-motor. The control circuit generates a pulse width modulated (PWM) control signal of which a duty cycle determines a speed of the motor. The motor is arranged between two half-bridges that are controlled by the PWM control signal and an inverted PWM control signal, respectively. A drawback of the prior art motor control circuit is the high ripple current and the high dissipation especially at zero output current to the motor.

SUMMARY OF THE INVENTION

It is an object of the invention to provide a driver for driving an inductive load which driver causes a lower ripple current through the inductive load. The invention is defined by the independent claims. Advantageous embodiments are defined in the dependent claims.

A driver in accordance with the first aspect of the invention has an input to receive a pulse width modulated control signal. The driver generates an output voltage across an inductive load, which voltage is determined by a pulse width (further also referred to as duty cycle) of the control signal. Or said differently, an average current flowing through the inductive load is controlled by the duty cycle of the control signal. The driver comprises a first and a second switch circuit. The first switch circuit receives a first switch signal and supplies a first output signal to a first terminal of the inductive load. The second switch circuit receives a second switch signal and supplies a second output signal to a second terminal of the inductive load.

The driver further comprises an inverter and delay circuit to generate the first and second switch signal from the control signal. The inverter and delay circuit is used to obtain the first and second switch signal that are delayed and inverted with respect to each other. The exact arrangement of the inverter and delay circuit is not relevant. For example, both an inverter and a delay circuit may be present in the chain that generates the second switch signal. Now, the first switch signal is the control signal and the second switch signal is the inverted and delayed (or the delayed and inverted) first switch signal. Obviously, both the inverter and the delay circuit may be present in the chain that generates the first switch signal. Alternatively, the inverter may invert the control signal to obtain the first switch signal and may be delayed to obtain the second switch signal, or the other way around. Because only the difference in delay between the two control signals is important, different delays may be present between the control signal and both the first switch signal and the second signal. Relevant is that the two switch signals are delayed and inverted with respect to each other, wherein the delay is selected such that, in a predetermined range of the duty cycle, for each one of the duty cycles, the first switch signal and the second switch signal do not cause opposite polarities of the voltage across the load. Thus, for a selected one of the duty cycles in the range all the pulses generated across the load have a same polarity, for different duty cycles, different polarities may occur.

Due to this delay and the inversion of the first and the second switch signal with respect to each other, the amplitude of the voltage across the inductive load is halved and the frequency of the pulses is doubled. Consequently, the ripple of the current through the inductive load is decreased considerably with respect to the prior art. Further, a zero current through the load is obtained at zero duty cycle instead of at 50% duty cycle of the output voltage across the load. This has the advantage that the ripple current and the dissipation at zero average current through the load are minimal. It has to be noted that the control signal can be supplied over a single wire. This is especially interesting if the driver is a separate integrated circuit that receives the control signal from a digital signal processor that is integrated in another chip.

In an embodiment, the delay has a fixed value. This simple embodiment is especially relevant if the repetition frequency of the control signal is fixed or varies between boundaries which allow to select a fixed value of the delay thereby still fulfilling the requirement that the delay time generated by the delay circuit is such that the voltage across the load is unipolar for each one of the duty cycles in the range.

In an embodiment, the delay is determined from the repetition frequency of the control signal. The delay circuit comprises a delay stage that generates the delay as a period of time that is a sub-period of the control signal period time. The control signal period time is the reciprocal of the repetition frequency of the control signal. Many possibilities exist to implement such a delay circuit. For example, in a digital implementation, the delay circuit counts a number of clock pulses occurring between corresponding edges of two successive pulses of the control signal and generates for every control signal period the delay by counting a particular number of clock pulses starting from each one of the edges.

Alternatively, the delay circuit may receive digital data from a digital signal processor that indicates the delay to be made.

The controllable delay has the advantage that the delay can be optimally fitted to the actual repetition frequency of the control signal, if this repetition frequency varies. This has the advantage that the driver is able to adjust its delay dependent on the repetition frequency that may be different for different applications.

In an embodiment, the delay circuit is constructed to be able to provide a delay in the range T/4 to 3T/4, wherein T is the control signal period. This range of delays leaves room for a useful range of the duty cycle of the control signal and thus for a useful control range of the average current through the inductive load.

In an embodiment, the delay has a value T/2. In this preferred embodiment, the voltage pulses across the inductive load occur equidistant in time and a wide control range of the duty cycle from zero to 100% is possible.

These and other aspects of the invention are apparent from and will be elucidated with reference to the embodiments described hereinafter.

BRIEF DESCRIPTION OF THE DRAWINGS

In the drawings:

FIG. 3 shows a block diagram of a system in accordance with an embodiment of the invention, FIGS. 4A to 4F show signals for elucidating the operation of the system shown in FIG. 3, FIGS. 5A to 5F show signals for further elucidating the operation of the system shown in FIG. 3, FIG. 6 shows an alternative embodiment of a driver in accordance with the invention, FIGS. 7A to 7F show signals for elucidating the operation of the driver shown in FIG. 6, and FIG. 8 schematically shows an optical disc drive.

It should be noted that items that have the same reference numbers in different Figures, have the same structural features and the same functions, or are the same signals. Where the function and/or structure of such an item have been explained, there is no necessity for repeated explanation thereof in the detailed description.

DETAILED DESCRIPTION

Figure 1:
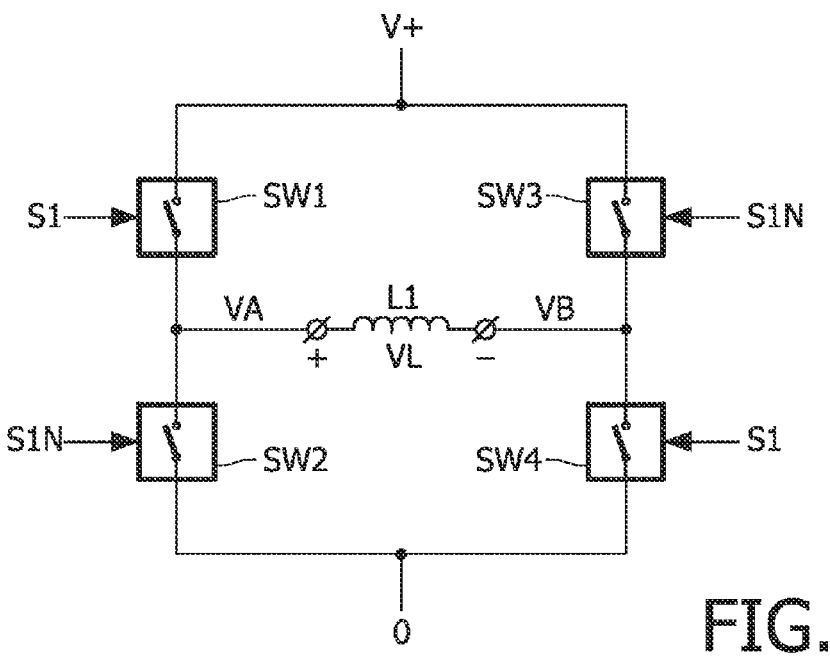
FIG. 1 shows schematically a relevant part of a prior art drive circuit.

FIG. 1 shows schematically a relevant part of a prior art drive circuit. The drive circuit comprises two switch circuits. One switch circuit comprises the series arrangement of the main current paths of the switches SW1 and SW2 to form a half bridge topology. The other switch circuit comprises the series arrangement of the main current paths of the switches SW3 and SW4 to form a half bridge topology. Each of the half bridges is arranged between the power supply voltage V+ and ground 0. The inductive load L1 is arranged between the junctions of the two main current paths of the respective half bridges. The control inputs of the switches SW1 and SW4 receive the same switch signal S1. The control inputs of the switches SW2 and SW3 receive the same switch signal S1N, which is the inverted switch signal S1.

Figure 2A:
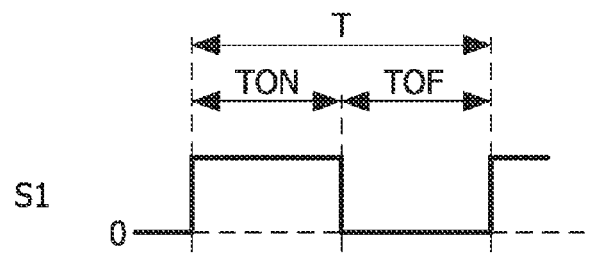
FIGS. 2A to 2E show signals for elucidating the operation of the prior art drive circuit shown in FIG. 1.
Figure 2B:
Figure 2C:
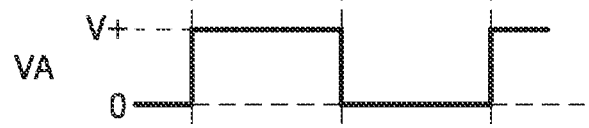
Figure 2D:
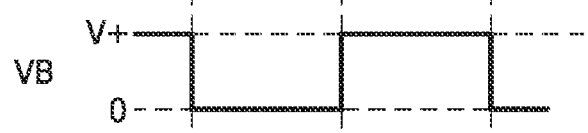
Figure 2E:
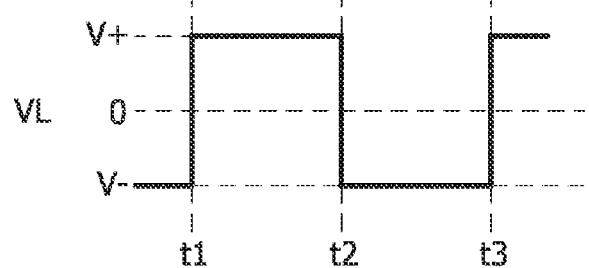

FIGS. 2A to 2E show signals for elucidating the operation of the prior art drive circuit shown in FIG. 1. FIG. 2A shows the switch signal S1, and FIG. 2B shows the inverse switch signal S1N. FIG. 2C shows the voltage VA at the junction of the main current paths of the switches SW1 and SW2. FIG. 2D shows the voltage VB at the junction of the main current paths of the switches SW3 and SW4. FIG. 2E shows the voltage VL across the inductive load L1 which is equal to the voltage VA minus the voltage VB.

In the example elucidated with respect to FIG. 2, it is assumed that a high level of the switch signal S1 or S1N causes the switches SW1 to SW4 to be closed while a low level causes the switches to be open. Further, the low level is indicated with 0 (zero) although in a practical implementation another voltage level may be required to open the switches. Again, in this example, it is further assumed that the main current paths of the switches have zero impedance. In a practical implementation usually FETs are used as the switches, which have a non-zero impedance. The voltage drops across these non-zero impedances lowers the voltage VL across the load L1.

At the instant t1, the switch signal S1 changes to the high level, and the switch signal S1N changes to the low level. Thus the switches SW1 and SW4 are closed while the switches SW2 and SW3 are opened. Consequently, the voltage VA becomes equal to the supply voltage V+, the voltage VB becomes equal to 0 (zero), and the voltage VL across the load L1 is equal to the supply voltage V+. At the instant t2, the switch signal S1 changes to the low level and the switch signal S1N changes to the high level. Now the switches SW1 and SW4 are open and the switches SW2 and SW3 are closed. The voltage VA becomes 0, the voltage VB becomes V+, and the voltage VL becomes minus V+. At the instant t3 a next cycle starts wherein the switch voltage S1 becomes high and the switch voltage S1N becomes low.

The duration of one cycle is indicated by the period duration T, the on-time of the switch signal S1 is indicated by TON, the off-time of the switch signal S1 in indicated by TOF. The duty-cycle of the switch signal S1 is the ratio of the duration of the on-time TON and the period duration T of one cycle. In the example shown, wherein the duration of the on-time TON and the off-time TOF are equal, the duty cycle is 50%. It has to be noted that the average current through the inductive load L1 due to the voltage VL, which has a 50% duty-cycle and which is symmetrical with respect to zero voltage, is zero. However, the peak current caused in the load L1 due to this voltage VL is quite high. Such a high peak current may cause mechanical stress in the inductive load L1. The high peak current may even cause small movements of a motor or actuator, which may directly or indirectly generate a disturbing audible noise. Further, the high currents cause resistive losses, and the varying voltage VL which has to change its amplitude by two times the power supply voltage V+ at a rate of two times per cycle causes capacitive losses. These losses lead to a high dissipation in a situation wherein the average current through the inductive load L1 should be zero.

FIG. 3 shows a block diagram of a system in accordance with an embodiment of the invention. The system comprises a circuit 2 that supplies a control signal CS to the driver 1. The driver 1 drives the inductive load 30, which is part of an apparatus 3. For example, the inductive load 30 may be a motor or an actuator of an optical disc drive 3. The optical disc drive 3 further comprises the driver 1 and the circuit 2 which may be a digital signal processor that receives input signals (not shown) to generate the control signal CS. For example, if the inductive load 30 is a tray motor, the input signals may be user input signals which indicate when the tray should be opened or closed and detection signals which detect the mechanical limit positions of the tray to switch off the motor when one of this limit positions is reached. An actuator for moving a read and/or write head may be completely controlled by internal circuitry such as a feedback loop.

The driver 1 in accordance with the embodiment shown in FIG. 3 comprises an inverter 11, a delay circuit 12, a switch circuit 10, and a switch circuit 13. The switch circuits 10 and 13 may comprise each a half bridge of switching elements as disclosed in the prior art U.S. Pat. No. 5,086,492. But other switching topologies are possible as long as the output voltage V1, V2 can be switched between two levels. Both the switching circuits 10, 13 shown in FIG. 3 receive a power supply voltage VB between a power supply input and a reference input, which in this example is connected to ground. The potential of ground is considered to be zero volts. If the input signal CS, DCS has a high level, the output of the switching circuits 10, 13 carries the power supply voltage VB. If the input signal CS, DCS has a low level, the output of the switching circuits 10, 13 carries zero volt. These input signals are also referred to as the switching signals.

The switching circuit 10 receives the control signal CS and supplies the voltage V1 to one terminal of the load 30. The inverter 11 inverts the control signal CS to obtain the inverted control signal ICS. The delay circuit 12 delays the inverted control signal ICS to obtain the delayed control signal DCS. The switching circuit 13 receives the delayed control signal DCS and supplies the voltage V2 to the other terminal of the load 30. The voltage VL, which is the voltage V1 minus the voltage V2, is present across the inductive load 30.

FIGS. 4A to 4F show signals for elucidating the operation of the system shown in FIG. 3. FIG. 4A shows the control signal CS. FIG. 4B shows the voltage V1 supplied by the switch circuit 10. FIG. 4C shows the inverted control signal ICS. FIG. 4D shows the delayed control signal DCS. FIG. 4E shows the voltage V2 supplied by the switch circuit 13. FIG. 4F shows the voltage VL across the load 30.

The periodical control signal CS has a period duration T which is the reciprocal of the repetition frequency of the control signal CS. Usually, the repetition frequency of the control signal CS is selected dependent on the particular application. The current through the load 30 is controlled by controlling the duty cycle of the control signal CS. The first period shown lasts from the instant t10 to the instant t12 and is indicated by T. The next period starts at the instant t12 and lasts to the instant t16. The duty cycle of the control signal CS is the ratio of the on-time TON and the period duration T. In the example shown, the duty cycle is 50% up to the instant t12, and 25% from the instant t12 onward. The inverted control signal ICS has the low level when the control signal CS has the high level and has the high level when the control signal CS has the low level. The delayed control signal DCS is the inverted control signal ICS which is delayed over half a period duration T. Although, in this example, the delay dT is half the period duration T, other delays are possible. However, the duty-cycle range and the delay dT should be selected such that the output voltage VL is unipolar for each one of the duty cycles which may occur. With unipolar is meant that the output voltage VL changes into one direction only, starting from the level that occurs at zero duty cycle.

At the instant t10 the control signal CS changes its level from low (indicated by 0) to high. Because the control signal CS is the switch signal for the switch circuit 10, the switch circuit 10 connects its output to the supply voltage VB and thus the voltage V1 changes its level to the supply voltage VB. The inverter 11 inverts the control signal CS and thus the inverted control signal ICS changes to the low level. The delayed control signal DCS, which is the switch signal for the switch circuit 13, is still high and thus the switch circuit 13 still supplies the supply voltage VB as the voltage V2. The voltage VL across the load 30 is still zero because the voltages V1 and V2 are equal. At the instant t11, the control signal CS changes its level from high to low. The switch circuit 10 changes the voltage V1 to the ground level. The inverted control signal ICS changes to the high level. The delayed control signal DCS changes to the low level, and thus the voltage V2 changes to ground level. Again, the voltage VL is zero because the voltages V1 and V2 are equal. Thus, during the period duration T lasting from instant t10 to instant t12, at a duty cycle of 50% of the control signal CS, the voltage across the inductive load 30 and thus the average current there through is zero. The high peak currents of the prior art are not present and the losses are minimal.

At the instant t12 a next period starts in which the duty cycle is 25%. This next period ends at the instant t16. The pulse of the control signal CS lasting from instant t12 to instant t13 gives rise to a pulse with the same polarity during the same period in time of the voltage V1, and to an inverted pulse during the same period in time of the inverted control signal ICS. The delayed control signal DCS is still high from instant t12 to the instant t14 due to the pulse lasting from instant t11 to instant t12 of the inverted control signal ICS. The pulse of the control signal CS lasting from instant t12 to instant t13 gives rise to the inverted pulse from instant t14 to t15 of the delayed control signal DCS.

Thus, in this embodiment, the pulse of the control signal CS which lasts from the instant t12 to t13 causes a pulse with the same polarity during the same time period in the voltage V1 and an inverted non-overlapping pulse during the time period lasting from instant t14 to instant t15 in the voltage V2. Consequently, during the period T lasting from instant t12 to instant t16, the voltage VL across the inductive load 30 is zero during the time periods lasting from instant t12 to instant t13 and from instant t14 to instant t15, and the voltage VL is the inverted supply voltage −VB during the time periods lasting from instant t13 to instant t14 and from instant t15 to instant t16. A same sequence of levels occurs during the period starting at the instant t16 as during the period starting at the instant t12. It has to be noted that with respect to the prior art U.S. Pat. No. 5,086,492, at the duty cycle of 25%, the double number of pulses is present across the load 30 with half the amplitude. Consequently, the peak current through the load 30 is much lower.

It has to be noted that at the duty cycle of 25% al the pulses in the output voltage VL change between zero voltage and the inverted supply voltage—VB and thus all have the same polarity.

FIGS. 5A to 5F show signals for further elucidating the operation of the system shown in FIG. 3. FIG. 5A shows the control signal CS which in this example has a duty cycle of 75%. FIG. 5B shows the voltage V1 supplied by the switch circuit 10. FIG. 5C shows the inverted control signal ICS. FIG. 5D shows the delayed control signal DCS. FIG. 5E shows the voltage V2 supplied by the switch circuit 13. FIG. 5F shows the voltage VL across the load 30.

The periodical control signal CS has a period duration T which is the reciprocal of the repetition frequency of the control signal CS. The current through the load 30 is controlled by controlling the duty cycle of the control signal CS. The first period shown lasts from the instant t3 to the instant t34 and is indicated by T. The next period starts at the instant t34 and lasts to the instant t38.

The inverted control signal ICS has the low level when the control signal CS has the high level and has the high level when the control signal CS has the low level. The delayed control signal DCS is the inverted control signal ICS which is delayed over half a period duration T. Although, in this example, the delay dT is half the period duration T, other delays dT are possible. However, the duty-cycle range and the delay dT should be selected such that the output voltage VL is unipolar for each one of the duty cycles within the range.

At the instants t30, t34 or t38 a next period starts all with a duty cycle of 25%. At these instants, the control signal CS changes from the low to the high level. Because the control signal CS is the switch signal for the switch circuit 10, the switch circuit 10 connects its output to the supply voltage VB and thus the voltage V1 changes its level to the supply voltage VB. The inverter 11 inverts the control signal CS and thus the inverted control signal ICS changes to the low level. The delayed control signal DCS, which is the switch signal for the switch circuit 13, is still low and thus the switch circuit 13 still supplies the ground level as the voltage V2. Consequently, the voltage VL across the load 30 is equal to the supply voltage VB. At the instants t31 and t35, the delayed control signal DCS changes its level from low to high, and the switch circuit 13 changes the voltage V2 to the supply voltage VB. Because now the voltages V1 and V2 are equal, the voltage VL across the load 30 is zero. At the instants t32 and t36, the delayed control signal DCS changes its level from high to low, and the switch circuit 13 changes the voltage V2 to the ground level. Consequently, the voltage VL across the load 30 is equal to the supply voltage VB.

At the instants t33 and t37, the control signal CS changes its high level to low, thus the voltage V1 changes its level to the ground level. The inverted control signal ICS changes to the high level. The delayed control signal DCS still has the low level, and thus the voltage V2 still has the ground level. Now, the voltage VL is zero because both the voltages V1 and V2 are equal to ground level.

Thus, during the period duration T lasting from instant t30 to instant t34, or from the instant t34 to the instant t38, at a duty cycle of 75% of the control signal CS, the voltage across the inductive load 30 changes unipolar between the ground level and the supply voltage VB.

It has to be noted that the duty cycle of 25% gives rise to an average current through the load 30, which is equal to but has the opposite sign of the average current caused by a duty cycle of 75%. However, in both situations, the output voltage VL across the load 30 has unipolar pulses which have half the amplitude of the pulses shown in FIG. 2E. Further, the repetition frequency of the pulses has been doubled.

FIG. 6 shows an alternative embodiment of a driver in accordance with the invention. Again, the driver 1 receives the control signal CS and supplies the voltages V1 and V2 to the inductive load 30 to obtain the voltage VL across the load 30. It is assumed that during the period duration T, which lasts from instant t20 to t22, the duty cycle of the control signal CS is 50%, while the duty cycle is 25% during the next periods T.

The driver comprises an inverter 15 that receives the control signal CS and supplies the inverted control signal ICS. A switch circuit 10 supplies the voltage V1, which has ground level if the inverted control signal ICS has a low level, and which has the supply level VB if the inverted control signal ICS has a high level. A delay circuit 16 delays the control signal CS over a period of time dT to obtain the delayed control signal CSD. The switch circuit 13 supplies the voltage V2, which has ground level if the delayed control signal CSD has a low level, and which has the supply level VB if the delayed control signal CSD has a high level. In this example, for the ease of explanation, both the low level and the ground level are shown to be zero volts. Further is assumed that the switches of the switch circuits 10 and 13 are ideal, and that the delay dT is half the period duration T.

FIGS. 7A to 7F show signals for elucidating the operation of the system shown in FIG. 6. FIG. 7A shows the control signal CS. FIG. 7B shows the inverted control signal ICS. FIG. 7C shows the voltage V1 supplied by the switch circuit 10. FIG. 7D shows the delayed control signal CSD. FIG. 7E shows the voltage V2 supplied by the switch circuit 13. FIG. 7F shows the voltage VL across the load 30.

The periodical control signal CS has a period duration T, which is the reciprocal of its repetition frequency. The first period T lasts from the instant t20 to the instant t22 and is indicated by T. The next period T starts at the instant t22 and lasts to the instant t26 and is not explicitly indicated. In the example shown, the duty cycle is 50% up to the instant t22, and 25% from the instant t22 onward. The inverted control signal ICS has the low level when the control signal CS has the high level and has the high level when the control signal CS has the low level. The delayed control signal DCS is the control signal CS which is delayed over half the period duration T. Although in this example the delay dT is half the period duration T, other delays are possible. However the duty-cycle and the delay dT should be selected such that the same pulse of the control signal CS occurs inverted and non-overlapping in the inverted control signal ICS and the delayed control signal DCS.

At the instant t20, the control signal CS changes to the high level, the inverted control signal ICS changes to the low level, and thus the voltage V1 changes to the ground level. Due to the delay of half a period duration T, the delayed control signal CSD changes to the low level, and thus the voltage V2 changes to the ground level. Consequently, the voltage VL, which is the voltage V1 minus the voltage V2, is zero volts. At the instant t21, the control signal CS changes to the low level, the inverted control signal ICS changes to the high level, and thus the voltage V1 changes to the supply level VB. Due to the delay of half a period duration T, the delayed control signal CSD changes to the high level, and thus the voltage V2 changes to the supply level VB. Consequently, the voltage VL which is the voltage V1 minus the voltage V2 is still zero volts.

At the instant t22 when a next period duration T starts, the control signal CS changes to the high level but now only a quarter of the period duration T, thus until instant t23. This pulse of the control signal CS gives rise to a pulse with the inverted polarity and the same duration in the inverted control signal ICS and to a non-overlapping pulse with the same polarity and duration, but shifted over half a period T and thus lasting from instant t24 to instant t25, in the delayed control signal CSD.

Consequently, during the period T lasting from instant t22 to instant t26, the voltage VL across the inductive load 30 is zero during the time periods lasting from instant t22 to instant t23 and from instant t24 to instant t25, and the voltage VL is the supply voltage VB during the time periods lasting from instant t23 to instant t24 and from instant t25 to instant t26. A same sequence of levels occurs during the period starting at the instant t26 as during the period starting at the instant t22.

Figure 8:
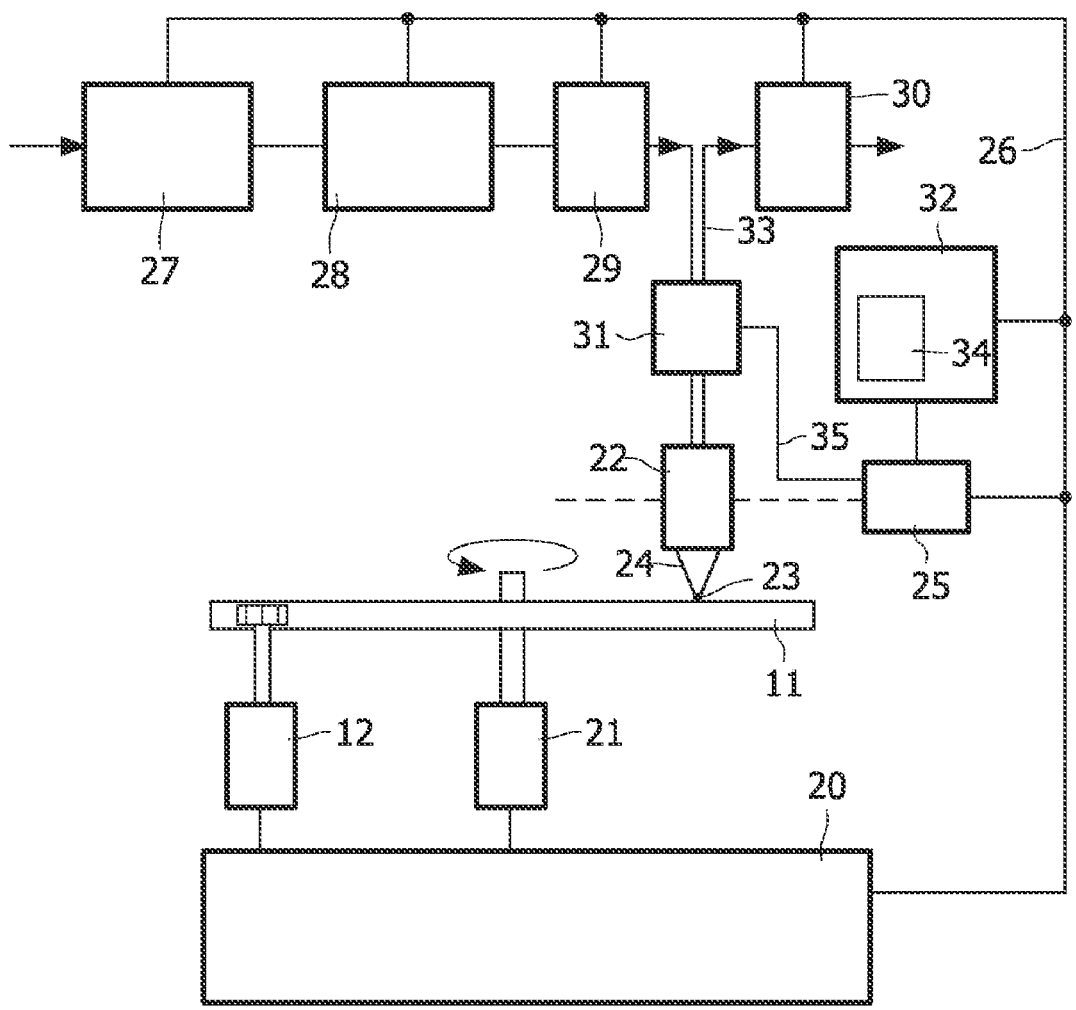

FIG. 8 schematically shows an optical disc drive. The optical disc drive has a tray 11 which may be driven by a motor 12. In the shown position of the tray 11, a central hole of a disc-shaped carrier (not shown) is centered with respect to an axis of the drive unit 21 and is rotated by this drive unit 21. The motor 12 drives the tray 11 to move outward a cabinet encasing of the optical disc drive to enable a user to place the disc-shaped carrier in the tray. The disc-shaped carrier has a track with recorded information and/or for recording information. The track is arranged in accordance with a spiral pattern of turns constituting substantially parallel tracks on an information layer. The record carrier may be an optical disc having an information layer of a recordable type. Examples of a recordable disc are CD-R, CD-RW, the DVD+RW, and the Blu-ray Disc (BD). The track on the recordable type of record carrier is indicated by a pre-embossed track structure provided during manufacture of the blank record carrier, for example a pregroove. Recorded information is represented on the information layer by optically detectable marks recorded along the track. The marks are constituted by variations of a physical parameter and thereby have different optical properties than their surroundings, e.g. variations in reflection. Control parameters as defined in a recording format may be recorded in a predefined area.

The optical disc drive is provided with means for scanning a track on a record carrier, which means include a drive unit 21 for rotating the record carrier when inserted, a head 22, a tracking servo unit 25 for positioning the head 22 on the track and a control unit 20. The record carrier is inserted by the motor 12 that moves the tray 11 from a position wherein the user can insert the record carrier to a position wherein the drive unit 21 can rotate the record carrier. The head 22 comprises an optical system of a known type for generating a radiation beam 24 guided through optical elements and focused to a radiation spot 23 on a track of the information layer of the record carrier. The radiation beam 24 is generated by a radiation source, e.g. a laser diode. The head 22 may contain all optical elements, the laser and detectors as an integrated unit, usually called Optical Pickup Unit (OPU), or may contain as a movable unit only some of the optical elements, while the remaining optical elements and laser and detector are located in a unit on a fixed mechanical location, usually called split-optics, the beam being transferred between both units, e.g. via a mirror. The head 22 further comprises (not shown) a focusing actuator for focusing the beam to the radiation spot on the track by moving the focus of the radiation beam 24 along the optical axis of said beam, and a tracking actuator for fine positioning of the spot 23 in a radial direction on the center of the track. The tracking actuator may comprise coils for radially moving an optical element or may alternatively be arranged for changing the angle of a reflecting element. For reading the radiation reflected by the information layer is detected by a detector of a usual type, e.g. a four-quadrant diode, in the head 22 for generating detector signals coupled to a front-end unit 31 for generating various scanning signals, including a main scanning signal 33 and error signals 35 for tracking and focusing. The error signals 35 are coupled to the tracking servo unit 25 for controlling the positioning of the head and the tracking actuators. The main scanning signal 33 is processed by read processing unit 30 of a usual type including a demodulator, de-formatter and output unit to retrieve the information.

The control unit 20 controls the scanning and retrieving of information, the drive unit 21, and the tray motor 12. The control unit 20 may be arranged to receive commands from a user or from a host computer. The control unit 20 is connected via control lines 26, e.g. a system bus, to the other units in the device. The control unit 20 comprises control circuitry, for example a microprocessor, a program memory and interfaces for performing the procedures and functions as described below. The control unit 20 may also be implemented as a state machine in logic circuits.

The device may be provided with recording means for recording information on a record carrier of a writable or re-writable type. The recording means cooperate with the head 22 and front-end unit 31 for generating a write beam of radiation, and comprise write processing means for processing the input information to generate a write signal to drive the head 22, which write processing means comprise an input unit 27, a formatter 28 and a modulator 29. For writing information the power of the beam of radiation is controlled by modulator 29 to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of polarization different from their surroundings, obtained when recording in magneto-optical material.

In an embodiment the input unit 27 comprises compression means for input signals such as analog audio and/or video, or digital uncompressed audio/video. Suitable compression means are described for video in the MPEG standards. MPEG-1 is defined in ISO/IEC 11172, and MPEG-2 is defined in ISO/IEC 13818. The input signal may alternatively be already encoded according to such standards.

In order to be able to read/write selected tracks on a complete disc the head is mounted on a movable sledge. This sledge is movable from an inner to an outer radius of the optical disc. Data to be accessed subsequently may be scattered all over the disc requiring jumping of the laser spot from one (defined) place on the disc to another (also defined place). Hence the jumps are needed to access the complete disc; the process usually called seeking featuring the sledge for radially positioning the head. The sledge moves on rails.

The present invention may for example be used to drive the tray motor 12, the tracking servo unit 25, the focusing actuator, or the motor for moving the sledge.

In the embodiments shown, a current through the load 30 is zero at a 50% duty cycle of the control signal CS. The current through the load is negative for duty cycles smaller than 50% and positive for duty cycles larger than 50%. Alternatively, the current through the load may be positive for duty cycles smaller than 50% and negative for duty cycles larger than 50%.

It should be noted that the above-mentioned embodiments illustrate rather than limit the invention, and that those skilled in the art will be able to design many alternative embodiments without departing from the scope of the appended claims.

For example, the embodiments elucidated have switch circuits 10 and 13 which supply ground level 0 if the input switch signal (CS, DCS; ICS, CSD) has a low level and which supply a supply voltage VB if the input switch signal has a high level. However, if one or both switch circuits operate oppositely in that they supply the supply voltage VB if the switch signal has a low level, the switch signals have to be adapted accordingly. Preferably, the switch circuits 10 and 13 are half bridges each comprising two electronic switches of which the main current paths are arranged in series and of which the control inputs receive inverted signals such that only one of the electronic switches is conductive at a given time. However other, more complex switch arrangements may be implemented.

The digital signal processor 2 and the driver 1 may be separate integrated circuits. The digital signal processor 2 may be a central processor controlling many functions. The driver 1 may be dedicated per inductive load 30 and is preferably arranged near to the load 30 to minimize track lengths between the outputs of the driver 1 and the load 30. Preferably, the control of the driver chip 3 by the digital signal processor chip 2 is possible with a single connection along which the control signal CS is forwarded. Nevertheless, optionally, a digital bus may be used to send additional information from the digital signal processor chip 2 to the driver chip 1. For example, the repetition frequency or the period duration T of the control signal CS may be forwarded.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A driver for supplying an output voltage to an inductive load, the driver comprising:
    an input for receiving a pulse width modulated control signal having a controllable duty cycle within a predetermined range,
    a first switch circuit for receiving a first switch signal to supply a first voltage,
    a second switch circuit for receiving a second switch signal to supply a second voltage, wherein the output voltage is a difference between the first voltage and the second voltage, and
    an inverter and delay circuit for receiving the control signal to supply the first switch signal and the second switch signal being inverted and delayed with respect to each other, wherein a delay of the delay circuit is selected to obtain an output voltage having a single polarity for each one of said controllable duty cycles within the predetermined range, and wherein the delay circuit is constructed for obtaining the delay having a value in the range T/4 to 3T/4, wherein T is the control signal period.

2. A driver as claimed in claim 1, wherein the delay circuit comprises a delay stage for obtaining the delay having a predetermined fixed value.

3. A driver as claimed in claim 1, wherein the delay circuit comprises a delay stage for generating the delay as a period of time being a sub-period of a control signal period, wherein the control signal period is a reciprocal of a repetition frequency of the control signal.

4. A driver as claimed in claim 1, wherein the delay has a value T/2.

5. A driver as claimed in claim 4, wherein the duty cycle is controllable in a range falling within or covering the range 0 to 100%.

6. A system comprising the driver as claimed in claim 1, and a digital signal processor for supplying the control signal.

7. A system as claimed in claim 6 further comprising the inductive load.

8. A system as claimed in claim 7, wherein the inductive load is a motor or an actuator.

9. An optical disc drive comprising the system of claim 8.

10. A method of supplying an output voltage to an inductive load, the method comprising:
 receiving a pulse width modulated control signal having a controllable duty cycle within a predetermined range,
 receiving a first switch signal to supply a first voltage,
 receiving a second switch signal to supply a second voltage, wherein the output voltage is a difference of the first voltage and the second voltage, and
 inverting and delaying to receive the control signal for obtaining the first switch signal and the second switch signal being inverted and delayed with respect to each other, wherein a delay of the delay circuit is selected to obtain an output voltage having a single polarity for each one of said controllable duty cycles within the predetermined range, wherein the delay has a value in a range T/4 to 3T/4, wherein T is a control signal period.

* * * * *